United States Patent [19]

Neale

[11] 4,146,785
[45] Mar. 27, 1979

[54] SUN-TRACKING CONTROL SYSTEM FOR SOLAR COLLECTOR

[75] Inventor: Stephen D. Neale, Phoenix, Ariz.

[73] Assignee: Sunpower Systems Corporation, Tempe, Ark.

[21] Appl. No.: 877,077

[22] Filed: Feb. 13, 1978

[51] Int. Cl.² ............................................. G01J 1/20
[52] U.S. Cl. ................................ 250/203 R; 250/209
[58] Field of Search .......................... 250/209, 203 R; 126/270, 271; 356/141, 152

[56] References Cited

U.S. PATENT DOCUMENTS 4,107,521  8/1978  Winders .......................... 250/203 R Primary Examiner—David C. Nelms
Assistant Examiner—Darwin R. Hostetter
Attorney, Agent, or Firm—Warren F. B. Lindsley

[57] ABSTRACT

A solid-state control system for the control of a collector array, the system incorporating a sun-tracking mode, de-focusing at excessive temperatures, returning to a stand-by position after sunset, and prepositioning at sunrise.

9 Claims, 14 Drawing Figures

SUN-TRACKING CONTROL SYSTEM FOR SOLAR COLLECTOR

BACKGROUND OF THE INVENTION

In recent years, the rapid expansion of the world's population coupled with the accelerated technological development of large sectors of the world has produced a dramatic increase in the demand for energy in all forms, including fuels and electricity for heating, lighting, transportation and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the Middle East countries, for supply. Such a dependence can and does have undesirable effects on the economies of the countries involved and political complications often result. There are also limited sites available that are appropriate for hydroelectric installations.

In the United States, there are a number of fossil fuels available such as high-sulphur coal and oil shale, but the development and use of these resources has been complicated by economic and environmental concerns which rule against the use of these resources for a number of reasons, including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. The World Book Encyclopedia (copyright 1963, USA) states that the amount of solar energy reaching the earth in one day equals the energy that could be produced by burning 550,000,000,000 tons of coal—as much coal as would be dug in the United States in 1000 years at the 1963 rate of mining. It further states that enough solar energy reaches the United States in 20 minutes to fill the country's entire power needs for one year.

The interest in this almost boundless resource and in its development and harnessing for use in homes and factories is rising as other resources dwindle. Its desirability is further enhanced by the fact that solar energy may be converted to practical use without the hazard of environmental contamination.

DESCRIPTION OF THE PRIOR ART

Until recently, the development of solar energy collectors has been associated for the most part with programs involving military and space applications while only limited attention has been given to broad consumer use. As a result, there is a great potential for improvements in existing collection devices that will result in reduced manufacturing costs and improved thermal efficiencies.

One such device known as a flat plate collector is described by the World Book Encyclopedia (copyright 1963). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

A major disadvantage of the flat plate collector is that it must be very large in order to collect sufficient energy, the large size resulting in part from the fact that except for brief periods during the day, its surface is not perpendicular to the rays of the sun.

A second disadvantage is that the flat plate collector does not permit the concentration of solar energy at a localized point as needed for the most effective heating of the water and the conversion of water to steam such as required in certain solar-to-electrical conversion processes.

Parabolic reflectors have been utilized in the past along with sun-tracking mechanisms in connection with various schemes for the collection, conversion and utilization of solar energy. Variations of such equipment are described in U.S. Pat. Nos. 495,163 (Apr. 11, 1893); 787,145 (Apr. 11, 1905); 820,127 (May 8, 1906); and 3,713,727 (Jan. 30, 1973).

W. C. Matlock (U.S. Pat. No. 4,000,734) discloses improved arrangements of parabolic reflectors with mechanical means provided for tracking the path of the sun throughout the course of the day. The tracking mechanism permits adjustments of both azimuth and elevation while retaining the location of the collector tubes at the focal point of the reflectors.

A complete and totally operational collector system of this type, however, requires the provision of an automatic control system which is optimally designed to effect the tracking operation. Such a control system is described in the present invention.

SUMMARY OF THE PRESENT INVENTION

In accordance with the invention claimed, an automatic control system is provided for the control of a set of parabolic reflectors in such a way as to cause the reflectors to track the daily path of the sun.

It is, therefore, one object of this invention to provide an automatic control system for the control of a solar collector.

Another object of this invention is to provide in such a system means for sensing the instantaneous direction of the sun.

A further object of this invention is to provide in such a system means for aligning the direction of the collector system with the instantaneous direction of the sun and thereby effecting a maximum rate of solar energy collection.

A still further object of this invention is to provide in such a system means for effecting a de-focusing of the collector array when collector or storage temperatures become excessive.

A still further object of this invention is to provide in such a system means for halting the generally westward motion of the collector array at the end of the day.

A still further object of this invention is to provide in such a system means for returning the direction of the collector array to a generally eastern direction each night prior to sunrise on the following day.

Yet another object of this invention is to provide in such a system means for effecting the pre-positioning of the collector array at sunrise and thereby to permit the capture of the solar position by the sensing means.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
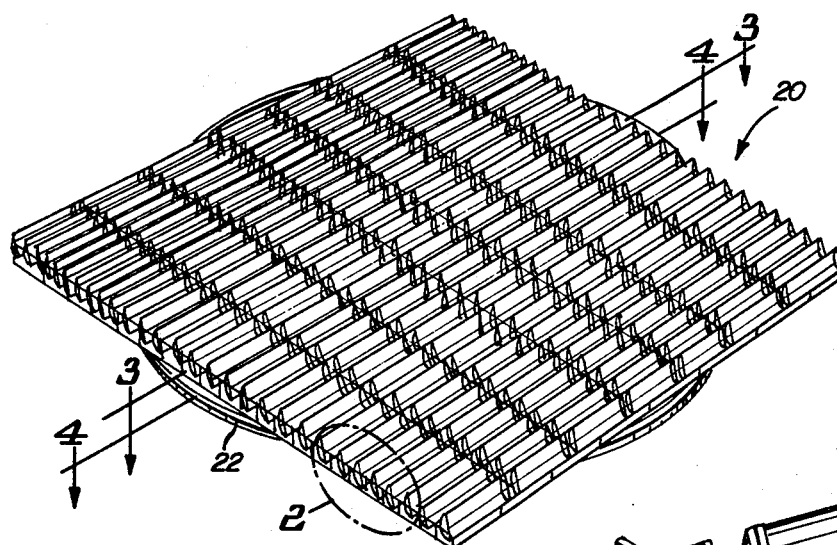
FIG. 1 is a perspective view of a solar energy collector contrived to be trained in the direction of the sun.

Referring more particularly to the drawing by characters of reference, FIGS. 1-5 disclose a solar energy collection and conversion system 20 utilizing an array 21 of pivoting reflectors rotatably supported on concentric circular concrete rings 22, the total structure forming a carousel-type structure.

Figure 2:
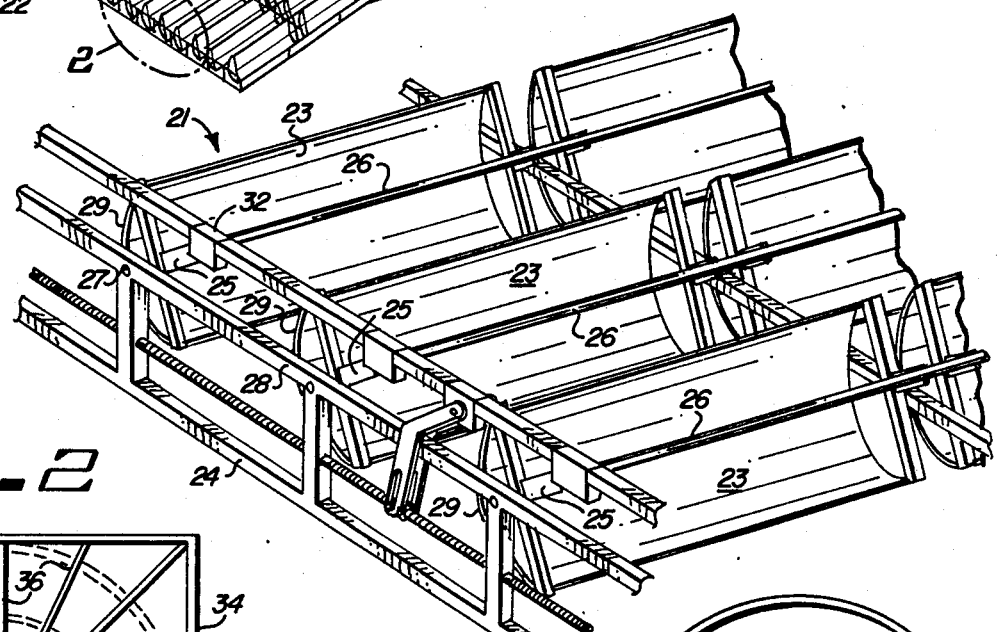
FIG. 2 is an enlarged view of a portion of the collector of FIG. 1 in the region 2 denoted in FIG. 1.

The array 21, a portion of which is shown in FIG. 2, comprises a multiplicity of trough-shaped reflectors 23, each pivotally mounted at both ends to a frame 24. An arm 25 extending perpendicularly from each end of each reflector 23 provides a support for a solar energy collector pipe 26 which runs parallel with the length of each reflector 23 coincident with its focal point so that the reflected rays of the sun are concentrated on pipe 26.

The pivotal mounting of reflectors 23 on the frame 24, as shown in FIG. 2, is accomplished by means of pivot pins 27 which pass through the top horizontal members 28 of the frame 24 and through the ends of the reflector frames 29 at the base of the support arms 25, as shown. Parallel rows of reflectors 23 are coupled together by the parallel collector pipes 26 and by transverse coupler bars 31 which are placed at intervals along the lengths of the rows of reflectors. The coupler bars 31 are pivotally attached to each of the collector pipes 26 by means of pivotal couplers 32 which engage the ends of the pipes 26. By virtue of the coupling thus afforded by pipes 26 and bars 31, reflectors 23 are caused to rotate in unison as the coupler bars 31 are moved horizontally.

Figure 4:
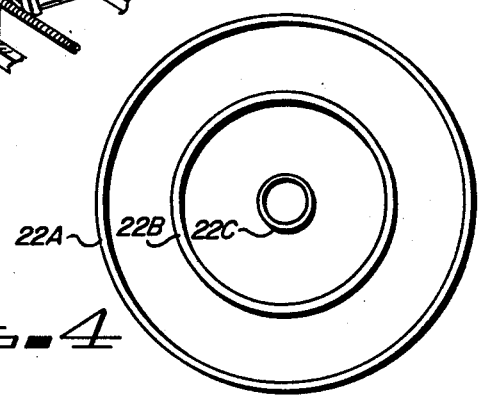
FIG. 4 is a cross-sectional view of FIG. 1 taken along line 4—4 of FIG. 1 and showing the three concentric circular tracks on which the framework of FIG. 3 is rotatably mounted.

The rotational tracking capability of system 20 is provided by mounting array 21 on a rotating platform 33 which rides on the concentric concrete rings 22, shown in FIGS. 1 and 4.

Figure 3:
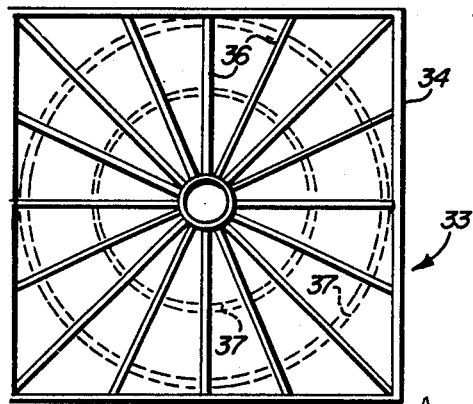
FIG. 3 is a sectional view of the collector of FIG. 1 showing the framework which supports the collector array as seen along line 3—3 of FIG. 1.

Platform 33, as shown in FIG. 3, comprises a square outer frame 34 and a center ring 35 joined by radial members 36 arranged like the spokes of a wheel between ring 35 and frame 34. The entire platform 33 is fabricated from lengths of tubular steel or aluminum welded together.

A number of roller or wheel assemblies not shown are attached to the underside of platform 34 positioned for alignment with the three concentric concrete rings 22A-22C shown in FIG. 4. The broken line circles 37 of FIG. 3 indicate the positions of the two outer rings 22A and 22B relative to the platform 33. The intersections of the radial members 36 and the circles 37 define the positions of the wheel assemblies which ride on the outer rings 22A and 22B. The lesser number of wheel assemblies may be uniformly spaced about ring 35 to ride on center concrete ring 22C.

Two low-speed reversible positioning motors (not shown in the drawing) are employed to cause the reflectors to be directed toward the position of the sun as it moves across the sky during the course of the day. The first motor is coupled to the coupler bar 31 causing bar 31 to be moved horizontally as appropriate to control the elevation of the reflectors 23. The second motor drives the platform 33 rotationally upon the tracks 22 causing the array 21 to follow the path of the sun from east to west during the course of the day and then causing it to be returned to an eastwardly direction after sundown. Associated with each of the two motors are two relays, the first being operated to control the direction of its rotation and the second to control its energization. The control circuit of FIG. 5 is designed to control both the energizing relay and the directional relay associated with one of the motors, there being one such circuit provided for each of the two motors.

Figure 5:
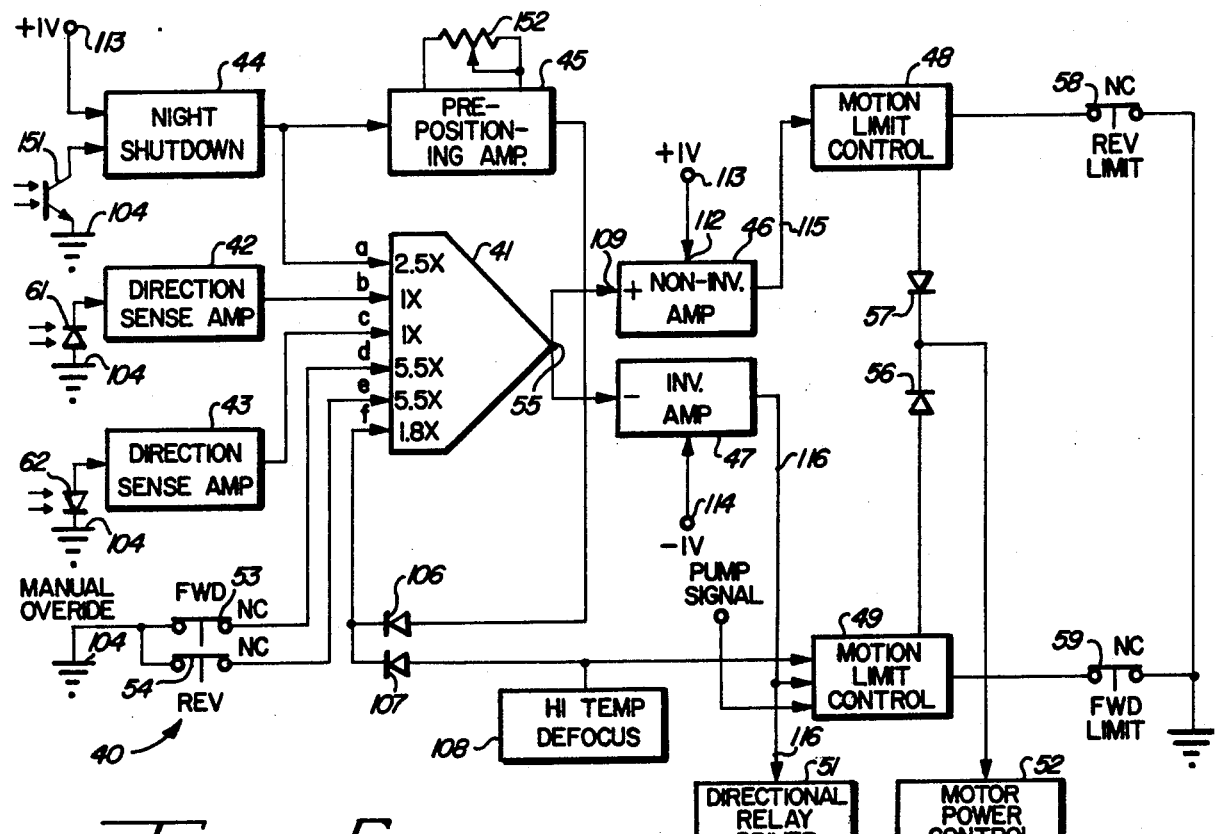
FIG. 5 is a simplified block diagram of the electronic control system of the invention which serves to effect the directional control of the collector of FIGS. 1-4.

The control system of FIG. 5 is adaptable to control the positioning motors in any of a number of different control modes as appropriate for specific applications. For the purpose of this description, the specific application is assumed to be one of heating water in a storage tank. In this application, the water from the storage tank is circulated through the collector pipes 26 by a pump which is controlled by circuits not included in FIG. 5.

The control mode for the assumed application proceeds as follows. The pump is operated only when the temperature of the water in the collector pipes 26 is a given number of degrees higher than the temperature of the water in the storage tank. If the temperature of the water in the storage tank is below the maximum controlled level, the control circuit causes the reflectors 23 to be directed as closely as possible toward the exact location of the sun. If the temperature of the water in the storage tank reaches or exceeds the maximum controlled level, the reflectors 23 are caused to lead the position of the sun, i.e. they are rotated somewhat westward and northward of the position of the sun. When the maximum allowable westward position of the array 21 is reached toward the end of the day, a limit switch operates to half the westward rotation. As the sun sets and solar radiation falls below a given level, a separate sensor causes the array to be reset to the morning position, i.e., the reflectors are tilted downward toward the horizon and the framework 34 is rotated eastward, the limits of both adjustments again being determined by limit switches. As the solar radiation again exceeds a given level with the rising of the sun, the reflectors 23 and the rotational position of the framework 34 are pre-positioned, i.e., they are advanced by an amount appropriate to allow the directional sensing circuits to capture the position of the sun. The control procedure then proceeds as outline earlier for the preceeding day.

The control system 40 of FIG. 5 which effects the mode of operation just described comprises a summing amplifier 41, two direction sense amplifiers 42 and 43, a night shut-down circuit 44, a pre-positioning amplifier 45, a non-inverting amplifier 46, an inverting amplifier 47, two motion limit control circuits 48 and 49, a directional relay driver 51, and a motor power control circuit 52. The function of the system 40 is to control the energization and direction of rotation of a motor which adjusts the elevation of the reflectors 23 of FIG. 2 or the angular direction of the array 21 of FIGS. 1 and 2, one such system being employed for each of these purposes.

Very briefly, the summing amplifier 41 receives positive or negative input signals from the direction sense amplifiers 42 and 43, from night shutdown circuit 44, from pre-positioning amplifier 45, from an external high-temperature defocus circuit and from manual over-ride switches, 53 and 54, and it responds to the signals received according to a predetermined system of priorities by delivering a positive or negative signal at its output terminal 55. The signal at terminal 55 drives either the non-inverting or the inverting amplifier 46 or 47, depending upon the polarity of the signal, a positive signal driving amplifier 47 and a negative signal driving amplifier 46. If amplifier 47 is driven, it produces an output signal which energizes directional relay driver 51 and also energizes motor control circuit 52 through motion limit control circuit 49 and diode 56 with the result that the drive motor will be caused to turn in the forward direction. If, on the other hand, amplifier 46 is driven, its output signal will energize only the motor control circuit 52 through limit control circuit 48 and diode 57. Because in this case directional relay driver 51 is not driven, rotation of the motor will be in the reverse direction. Total rotation in either direction is limited by the operation of the reverse and forward limit switches 58 and 59, respectively, which disable limit control circuit 48 or 49 to prevent energization of the motor. Energization of the motor is also enabled during the operation of the circulating pump in the presence of a high temperature de-focusing signal. This is accomplished by injection of a pump signal and a de-focusing signal at the input of limit control circuit 49.

Figure 9:
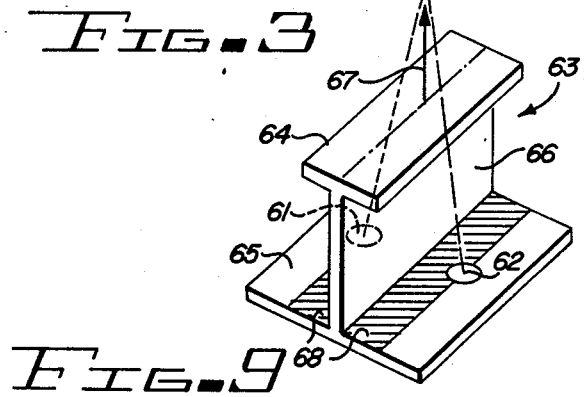
FIG. 9 is a simplified perspective view of the sun sensor element employed in connection with the control system of FIG. 5.

Direction sense amplifiers 42 and 43, as shown in FIG. 5, respond to signals produced at their input terminals across photo diodes 61 and 62, diode 61 being connected at the input of amplifier 42, and diode 62 being connected at the input of amplifier 43. The diodes 61 and 62 are mounted on the sensor element 63, as shown in FIG. 9.

Sensor element 63 comprises parallel upper and lower rectangular plates 64 and 65, respectively, joined at their longitudinal centerlines by a rectangular web 66 which is perpendicular to the plates 64 and 65. Element 63 is mounted in a fixed position on one of the reflectors 23 of FIG. 2 and is directionally aligned therewith such that when the reflector 23 is directed toward the sun, a vector 67 perpendicularly emanating upward from the center of upper plate 64 of element 63 is also directed toward the sun. When such an alignment of element 63 is achieved, the narrower upper plate 64 casts a centered shadow 68 on lower plate 65, and the photo diodes 61 and 62 which are symmetrically positioned on opposite sides of web 66 will lie at the edges of the shadow 68. As misalignment with the sun occurs, one or the other of diodes 61 and 62 will move out of the shadow and the other will move into the shadow so that one of the amplifiers 42 or 43 will receive a relatively stronger signal than the other from its connected photo diode 61 or 62.

Amplifiers 42 and 43 are identical, but the diodes 61 and 62 are oppositely polarized at the amplifier inputs. Diode 61 has its anode grounded and its cathode connected to the input terminal of amplifier 42 while diode 62 has its cathode connected to ground. Because of the opposite polarization, exposure of diode 61 to sunlight causes a positive signal to be produced at the input terminal of amplifier 42 while exposure of diode 62 produces a negative signal at the input of amplifier 43. Correspondingly positive and negative signals are produced at the output terminals of the amplifiers.

Figure 6:
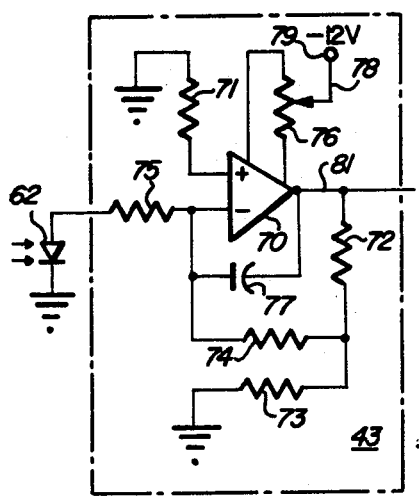
FIG. 6 is a circuit diagram of one of the direction sense amplifiers utilized in the control system of FIG. 5.

Amplifier 43, as shown schematically in FIG. 6, is a conventional amplifier circuit comprising a differential amplifier 70, resistors 71–75, potentiometer 76 and capacitor 77. Potentiometer 76 has its brush 78 connected to a negative 12-volt source 79; its other terminals are connected to the balance input terminals of amplifier 70. Potentiometer 76 is adjusted with diode 62 shielded from light to achieve a zero d-c balance for amplifier 43. The non-inverting input terminal of amplifier 70 is grounded through resistor 71 and the inverting input terminal is connected to the anode of diode 62 through resistor 75. Resistors 72–74 are connected as a feedback network. Resistors 72 and 73 are serially connected from the output terminal 81 to ground, and resistor 74 is connected from the common junction between resistors 72 and 73 to the inverting input terminal of amplifier 70. Capacitor 77 is connected for noise suppression between output terminal 81 and the inverting input terminal. Because the signal from diode 62 is connected to the inverting input terminal, a positive signal across diode 62 produces a negative signal at output terminal 81. In similar fashion, a negative signal across diode 61 in FIG. 5 produces a positive signal at the output of amplifier 42.

The diodes 61 and 62 of FIGS. 5 and 6 are gallium arsenide photo diodes. When exposed to light, a positive voltage, anode-to-cathode is generated, and when a relatively low value of resistance is connected across the diode, the current flowing in the resistor will be proportional to the light intensity. In this application, the external resistance is sufficiently low that the voltage developed across the diode is only a fraction of a volt so that it does not exceed the intrinsic forward drop of the diode.

The gallium arsenide diode has a rather narrow band spectral response as compared with a silicon diode, and the response is approximately centered on the frequency band of the direct radiation from the sun. The gallium arsenide diode thus produces the desired discrimination against reflected light which could otherwise upset the accuracy or reliability of the sun-tracking systems.

Because of the natural and inherent frequency selectivity associated with the gallium arsenide diode, this device can be employed effectively without a filter as would be required if a silicon diode were employed. The elimination of the need for a filter provides an important economic advantage.

In addition to the cost advantage, the gallium arsenide diodes are also easy to handle and mount, and their small size contributes to detection accuracy and permits a small overall detector element design.

Figure 7:
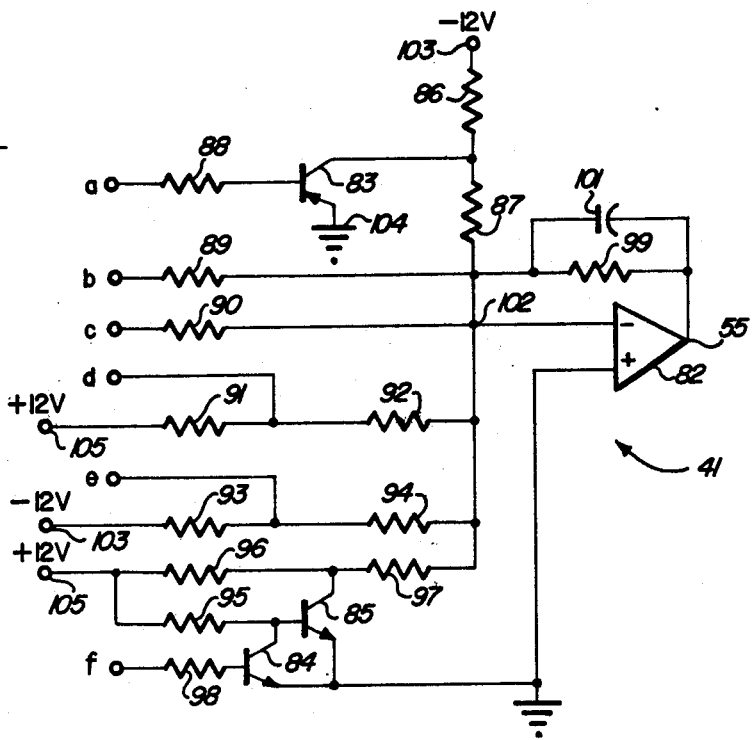
FIG. 7 is a circuit diagram of the sunning amplifier incorporated in the control system of FIG. 5.

The summing amplifier 41, as shown schematically in FIG. 7, comprises a differential amplifier 82, PNP transistor 83, NPN transistors 84 and 85, resistors 86-99, and capacitor 101. Input terminals a-f of amplifier 41, as shown in FIG. 5, are correspondingly identified in FIG. 7.

Input signals from the six input terminals a-f are coupled through resistance netwoks of different values to the inverting input terminal 102 of amplifier 82. The net signal delivered to the inverting input terminal 102 is the weighted summation of the signals present at terminals a-f. Different effective resistances between the individual terminals a-f and terminal 102 produce differing degrees of response for amplifier 41. Thus, as suggested by notations shown in FIG. 5, if the gain for signals applied at terminals b and c is chosen as the base of reference, the relative gain at terminal a is 2.5, at d and e the relative gain is 5.5, and at terminal f it is 1.8. The effect of the different gains is that a signal at terminal a will override a signal of corresponding magnitude at terminals b, c or f; a signal at terminal f will override signals at b and c, and a signal at d or e will override signals at all other terminals.

Negative or positive signals at terminals b or c produce signal currents through resistor 89 or 90 to terminal 102. The coupling from terminals a, d, e and f is not quite so direct. A signal applied at terminal a controls the state of transistor 83, and transistor 83 controls the admission of a signal from the negative 12-volt source 103. Thus, when terminal a is negative, a base drive current flows from ground terminal 104 through the emitter-base junction of transistor 83 and through resistor 88 to terminal a. This base drive current renders transistor 83 conductive for current flow from ground terminal 104, through transistor 83, emitter to collector, and through resistor 86 to source 103 so that the junction of resistors 86 and 87 is approximately at ground potential or substantially at zero signal level relative to terminal 102. When terminal a is positive, however, the base-emitter junction of transistor 83 is back-biased, transistor 83 is non-conductive, and a negative signal is transmitted from source 103 through resistors 86 and 87. The current flowing through resistors 86 and 87 during this condition will be approximately 2.5 times as great as that flowing through resistor 89 or 90 when a maximum signal level persists at terminal b or c.

If switch 53 at terminal d is open, a signal current flows from the positive 12-volt source 105 through resistors 91 and 92 to terminal 102, but if switch 53 is closed, it connects terminal d to ground terminal 104 so that no signal current flows to terminal 102. In the same fashion, if switch 54 is open, a signal current flows from terminal 102 through resistors 94 and 93 to source 103, but if switch 54 is closed, it ties terminal e to ground and no signal current flows. The current flowing through resistors 91 and 92 or 93 and 94 with switch 53 or 54 open will be approximately five times the maximum signal current flowing through resistor 89 or 90.

Finally, terminal f is coupled to terminal 102 through two transistor stages. A positive signal at terminal f arriving through diode 106 from pre-positioning amplifier 45 or through diode 107 from an external high temperature defocus circuit 108 supplies a positive base drive current to transistor 84, causing transistor 84 to become conductive so that current otherwise flowing from source 105 through resistor 95 into the base of transistor 85 now flows through transistor 84 to ground terminal 104. Thus deprived of base drive current, transistor 85 is rendered non-conductive and a positive signal current flows from source 105 through resistors 96 and 97 to terminal 102, the magnitude of the signal current being 1.8 times the maximum signal current from terminals b or c. In the absence of a positive signal level at terminal f, transistor 84 is rendered non-conductive, transistor 85 is rendered conductive by base drive current flowing through resistor 95, and current from source 105 flows through resistor 96 and transistor 85 to ground terminal 104 so that no signal is coupled to terminal 102.

It will be recognized that the higher signal currents predominate over the lower ones, and the desired system of priorities is thus established. Thus, if one of the normally closed manual override switches 53 or 54 is open, the resulting drive to amplifier 82 is sufficient to cause rotation of the drive motor in the desired direction regardless of the presence of opposing signals at terminals a, b, c or f, while a signal at terminal b or c will be effective only if there are no signals present at any of the other terminals.

The output signal developed at output terminal 55 of amplifier 41 may be positive or negative, and it is delivered to the input terminals of amplifiers 46 and 47.

Amplifier 46 is a differential amplifier or comparator with an input terminal 109, an output terminal 111 and a reference terminal 112. Terminal 112 is connected to a positive one-volt reference 113. Amplifier 46 responds to positive input signals in excess of the positive one-volt reference 113 by producing a negative signal at its output terminal 111. Also incorporated in amplifier 46 is a hysteresis characteristic which causes a given output level to be sustained at a lower input level than is initially required to produce the given output level. The one-volt initial offset and the hysteresis effect promote stability of the sun-tracking system.

Amplifier 47 is similar to amplifier 46 except that while in amplifier 46 the signal is introduced at its non-inverting input terminal and a positive one-volt reference is connected to its inverting input terminal, in amplifier 46 the signal is introduced at the inverting input terminal and the non-inverting input terminal is connected to a negative one-volt reference source 114.

Amplifier 47 thus responds to a negative input signal in excess of the negative one-volt reference by producing a positive output signal.

It is thus seen that a positive signal level produced at output terminal 55 of amplifier 41 is transmitted through amplifier 46 while a negative signal at terminal 55 is transmitted through amplifier 47. In either case, the signal at the output of amplifier 46 or 47 is a positive signal. The output signal from amplifier 46 is transmitted via line 115 to motion limit control circuit 48, and the output signal from amplifier 47 is carried by line 116 to motion limit control circuit 49 and directional relay driver 51.

Figure 11:
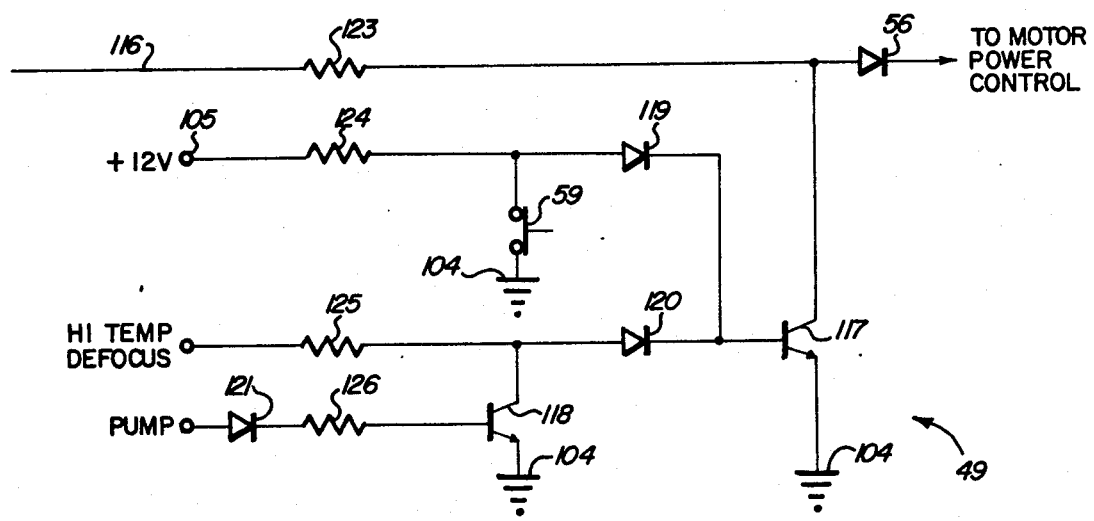
FIG. 11 is a schematic diagram of a motion limit control circuit employed in the control system of the invention.

Motion limit control circuit 49, as shown schematically in FIG. 11, includes two NPN transistors 117 and 118, three diodes 119-121 and four resistors 123-126. Resistor 123 is serially connected between line 116 and diode 56 and thus normally carries the signal from amplifier 47 to motor power control 52. Transistor 117, however, has its collector connected to the junction between resistor 123 and the anode of diode 56, and its emitter is connected to ground terminal 104. Thus, when transistor 117 is turned on it grounds out the signal from amplifier 46, thereby inhibiting the energization of the motor via amplifier 47.

Transistor 117 may be turned on by one of two means: a first base drive current may be supplied from the positive twelve-volt source 105 through resistor 124 and diode 119, and a second base drive current may be supplied from the high temperature defocus 108 through resistor 125 and diode 120. The first base drive current is shorted to ground by the normally closed forward limit switch 59 except in the limit position, and the second base drive current may be inhibited by turning on transistor 118 which is connected between the anode of diode 120 and ground terminal 104.

Transistor 118 is turned on by a pump signal flowing through diode 121 and resistor 126 to the base of transistor 118, indicating that the circulating pump is circulating fluid between the solar collector pipes 26 and the storage tank.

Motion limit control circuit 48 is similar to circuit 59, but it has no provision for reacting to high temperature defocus or pump signals. Circuit 48 passes signals from amplifier 46 through diode 57 to motor power control 52 unless the reverse limit is reached and reverse limit switch 58 has opened.

Figure 8:
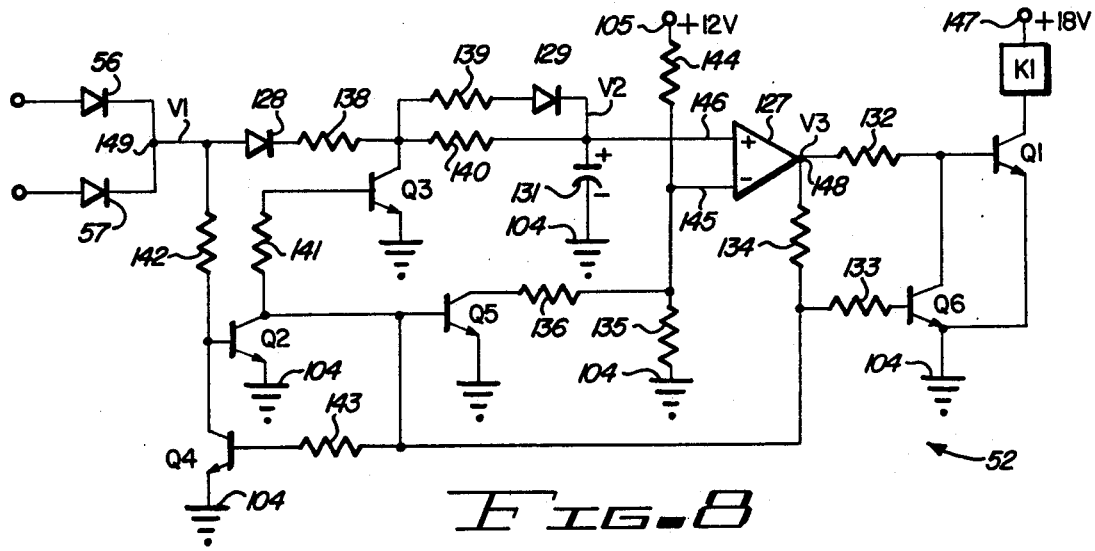
FIG. 8 is a circuit diagram of the motor control circuit employed in the control system of FIG. 5.

Motor power control 52, as shown in FIG. 8, includes a differential amplifier 127; six NPN transistors, Q1–Q6; two diodes, 128 and 129; a capacitor 131; and thirteen resistors, 132-144. Resistors 144 and 135 are serially connected as a voltage divider between the positive twelve-volt source 105 and ground terminal 104. The inverting input terminal 145 of amplifier 127 is connected to the junction between resistors 135 and 144. The cathodes of diodes 56 and 57, also shown in FIG. 5, are connected through serially arranged diode 128 and resistors 138 and 140 to the non-inverting input terminal 146 of amplifier 127. Resistor 139 and diode 129 are serially connected in parallel with resistor 140, with the cathode of diode 129 connected to terminal 146. Capacitor 131 is connected between terminal 146 and ground terminal 104. All six transistors, Q1–Q6, have their emitters connected to ground terminal 104. Transistor Q1 has its collector connected through a motor drive relay K1 to a positive voltage source 147, and its base is connected through resistor 132 to the output terminal 148 of amplifier 127. Transistor Q3 has its collector connected to the common junction between resistors 138, 139 and 140. Transistor Q6 has its collector connected to the base of transistor Q1, transistor Q5 has its collector connected to terminal 145 through resistor 136, transistor Q4 has its collector connected to the base of transistor Q2 and through resistor 142 to the cathodes of diodes 56 and 57. Transistor Q2 has its collector connected through resistor 141 to the base of transistor Q3. The collector of transistor Q2 is also connected through resistor 137 to the base of Q5, through resistor 143 to the base of Q4, through resistor 133 to the base of Q6, and through resistor 134 to the output terminal 148 of amplifier 127.

By virtue of the connection of the collector of transistor Q2 to the base terminals of transistors Q3, Q4, Q5 and Q6 as just described, transistors Q3–Q6 will be turned off when Q2 is turned on. When Q2 is not turned on, a positive signal at the output of amplifier 127 will provide base drive currents to transistors Q3–Q6. Amplifier 127 cannot deliver base drive current to transistor Q1 unless transistor Q6 is turned off by the turning-on of transistor Q2. Transistor Q2 cannot be turned on unless transistor Q4 is turned off, etc. It is thus seen that the operations of the six transistors, Q1–Q6, are highly interdependent.

Figure 10:
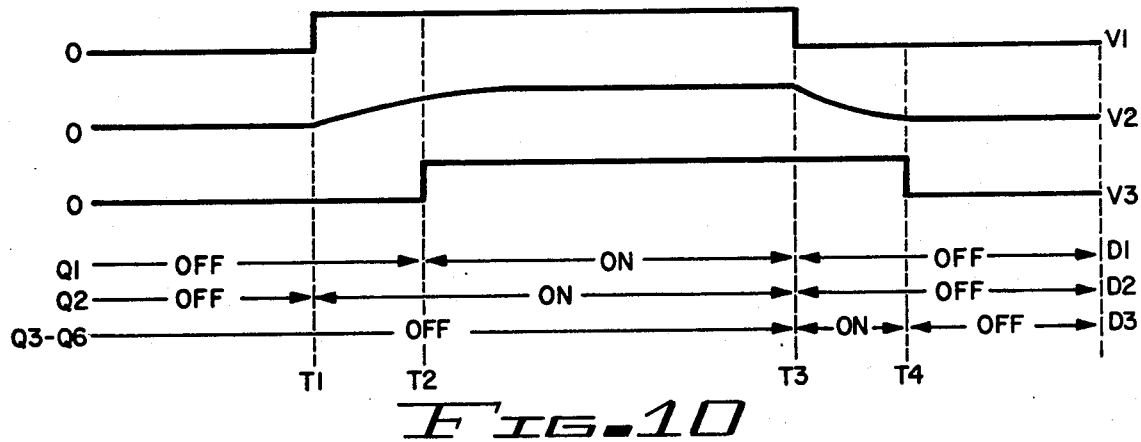
FIG. 10 is a timing diagram for the circuit of FIG. 8 showing voltage waveforms and the states of transistors as they occur through the cause of a power-on and power-off cycle.

As an aid in the description of the operation of the circuit 52 of FIG. 8, the waveforms and diagrams of FIG. 10 are provided. Waveforms V1, V2 and V3 represent signals at three points in circuit 52 through a complete power-on and power-off cycle of the drive motor. V1 is the signal at the cathodes of diodes 56 and 57 which is actually the input terminal 149 of circuit 52; V2 is the signal at the noninverting input terminal 146 of amplifier 127; and V3 is the signal at output terminal 148 of amplifier 127. Diagrams D1, D2 and D3 illustrate conditions of transistors Q1–Q6 throughout the operating cycle. Initially, in the absence of a signal from either motion limit control 48 or 49 of FIG. 5, signals V1, V2 and V3 are all at zero or ground levels and transistors Q1–Q6 are all off. At time T1, a positive signal appears at terminal 149, the positive signal representing a turn-on command for the drive motor. Transistor Q2 is turned on by base drive through resistor 142 and a charging current begins flowing through diode 128, resistor 138 and through the parallel network comprising resistors 139, 140 and diode 129 to capacitor 131. The voltage V3 at the positive plate of capacitor 131 rises exponentially, as shown in FIG. 10, until at time T2 the voltage at terminal 146 of amplifier 127 exceeds the voltage at terminal 145. At this point, the signal V3 at the output of amplifier 127 rises abruptly and base drive is supplied from terminal 148 through resistor 132 to transistor Q1 so that Q1 is turned on to energize relay K1 which, in turn, energizes the drive motor to turn the array 20 of FIG. 1. At time T3, the signal at terminal 149 falls to zero as conditions monitored by system 40 of FIG. 5 indicate the drive motor should again be de-energized. Transistor Q2 immediately turns off, and consequently transistors Q3–Q6 are turned on by base drive supplied from terminal 148. The conduction of Q6 causes Q1 to turn off so that relay K1 is de-energized coincident with the fall of signal V1, even though the sustained charge on capacitor 131 causes signal V3 to remain positive. As capacitor 131 discharges through resistor 140 and transistor Q3 following time T3, transistors Q3–Q6 remain turned on until at time T4 the voltage on capacitor 131 and at terminal 146 falls below the voltage at terminal 145 whereupon signal V3 falls to zero and transistors Q3–Q6 turn off.

It will be noted that during the period T3 to T4, certain conditions exist which are of importance to the proper control of the motor. First, as Q5 turns on, the reference voltage at terminal 145 of amplifier 127 falls to a lower level so that a hysteresis effect is provided which prevents oscillation or "chatter" near the switching point of amplifier 127. Secondly, with Q3, Q4 and Q6 turned on during this period, motor turn-on is prevented even though a turn-on signal may reappear at terminal 149. This "dead" period following the operation of the drive motor is also needed to assure stability of the control system under various conditions. Momentary disruptions of light to photo-sensing elements, for example, could otherwise cause the motor to be energized, de-energized and re-energized in rapid succession.

The operation of the entire control system 40 will now be described as it effects the directional control of the array 21 throughout the course of the day.

As a starting point, it is assumed that the reflectors 23 are trained directly toward the sun, and the temperature of the water in the storage tank is below the maximum or limit temperature. The solar radiation level is sufficiently high that amplifier 41 is not under the control of circuit 44. The limit switches 58 and 59 are closed and control 52 is able to respond to input signals received from amplifiers 46 and 47.

As the sun moves westward, photo diode 61 receives increased solar radiation while diode 62 becomes shaded by plate 64 so that an increasingly positive voltage level is produced at the output terminal of amplifier 42 and a negative voltage at terminal 55 of amplifier 41. The negative signal at terminal 55 is inverted by amplifier 47 and is delivered to relay driver 51 and to motor power control 52. The directional relay is energized to set the forward or westward direction and control 52 energizes the drive motor. The motor now operates, causing the array 21 to rotate toward the west until the sun again comes into focus.

As alignment of the array 21 is achieved, the imbalance of solar radiation striking diodes 61 and 62 is removed and the output signal of amplifier 41 falls again to zero. The output of amplifier 47 responds, also falling to zero and circuits 51 and 52 are consequently turned off so that motor operation is terminated.

As the sun continues to move westward, the tracking mode just described in continued. Simultaneously, a water circulation pump is cycled on and off, the pump circulating water from the storage tank through collector pipe 26 whenever the temperature differential between the collector pipes 26 and the storage tank exceeds a maximum controlled level.

If the temperature of the water in the storage tank exceeds a maximum absolute level or limit such as 180 degrees Fahrenheit, a different mode of operation is initiated. When such a condition is sensed by a storage temperature monitoring device associated with defocus circuit 108, and a positive signal from the monitoring device is introduced as a high temperature defocus signal at the anode of diode 107 of amplifier 41. The positive signal introduced at diode 107 overrides the effect of the photo diodes 61 and 62 of amplifiers 42 and 43 and drives the inverting input terminal of amplifier 41 positive so that a negative signal results at the output terminal 55 of amplifier 41. Amplifier 47 again responds by delivering a positive signal to line 116 which causes driver 51 to energize the directional relay for forward or westward rotation. Limit control circuit 49, however, inhibits passage of the signal to power control circuit 52 until the necessary temperature differential is attained between the collector pipe 26 and the storage tank. When this occurs, the circulation pump turns on and a pump signal is delivered to circuit 49. The signal from amplifier 47 is now passed by limit control circuit 49 for the duration of the pump operation and the rotational drive motor is energized to move the array direction to a defocused position ahead of the sun. The westward rotation continues until the pump turns off with the equalization of collector and storage temperatures. Gradually the array 21 again becomes focused on the sun as the sun continues westward. An ensuing temperature differential again causes the pump to operate, and during the operation of the pump the array is again moved an angular increment ahead of the sun. So long as the storage temperature remains above the limit level, the array is thus caused to lead the position of the sun as just described. If the storage temperature falls below the limit value, the operation reverts to the first control mode under the control of the direction sense amplifiers 42 and 43.

As the day ends with the setting of the sun, the rotation of the array 21 reaches a limit where the limit switch 59 is caused to open, thereby disabling the westward rotation of the drive motor as described earlier. As the sun sets, the solar radiation received by a photo transistor 151 connected at the input of night shutdown circuit 44 is reduced to a point at which its collector voltage falls below the one-volt reference 113. At this time, the output of circuit 44 switches to a positive level. The positive signal from circuit 44 is delivered to terminal a of amplifier 44, and in accordance with the priority system described earlier, it overrides signals from sense amplifiers 42 and 43 and causes amplifier 41 to deliver a positive signal at its output terminal 55. Amplifier 46 responds to the positive signal at terminal 55 and enables power control circuit 52 which, in turn, enables the drive motor. Because the directional relay is not energized, the array is rotated in the reverse or eastward direction. Eastward rotation continues until the reverse limit switch opens, whereupon the rotational drive motor is de-energized.

The positive signal from circuit 44 is also applied as an input signal to pre-positioning amplifier 45, and amplifier 45 responds by producing a positive output signal which it delivers to terminal f of amplifier 41 via diode 106. Because of the priority system established at the input of amplifier 41, however, the signal at terminal f is ineffective so long as the night shutdown signal is present at terminal a.

The array 21 remains at the eastward limit position throughout the night. As the sun rises again the following morning, the level of solar radiation sensed by photo transistor 151 of circuit 44 increases and the voltage at the input terminal of circuit 44 again falls below the threshold level. As this occurs, the output signal from circuit 44 falls to zero or to a negative level so that the signal at terminal a of amplifier 41 disappears. Pre-positioning amplifier 45, however, has incorporated in its design a turn-off delay adjustable by means of a potentiometer 152 which causes its output signal to remain positive for a given period of time after its input signal has gone to zero. The signal delivered by amplifier 45 to terminal f of amplifier 41 thus persists for some time after the signal at terminal a has terminated, and during this interval, the signal at terminal f has control of amplifier 41 causing a negative signal to be produced at output terminal 51. The negative signal is responded to by amplifier 47 which enables circuits 51 and 52 to produce forward rotation of the array 21 by an increment sufficient to position array 21 at an appropriate orientation to permit capture of the sun by sensing element 63 and amplifiers 42 and 43. As the position of the rising sun is captured by sensor 63, the tracking modes described for the previous day are again initiated.

Manual intervention in the control of the array is possible at any time by means of the normally closed switches 53 and 54. By virtue of the high priority associated with these switches, they take precedence over all other inputs of amplifier 41. Thus, for example, if switch 53 is opened, a positive input to amplifier 41 produces a negative signal at output terminal 55 and forward rotation of the array 21 results. Similarly, the opening of switch 54 produces a negative input signal and a positive output signal at terminal 55, resulting in reverse rotation of the array.

During the preceding descriptions, reference has been made to control of eastward and westward rotation of the array 21. It is to be understood that an identical control system is utilized to control the elevation of the reflectors 23.

Figure 12:
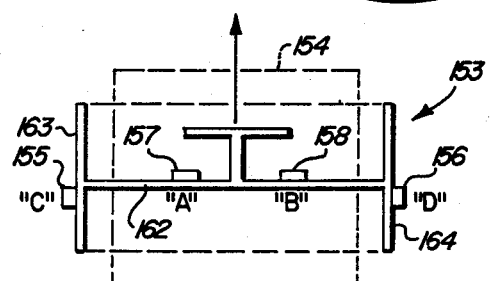
FIG. 12 is a representation of a modified solar sensor element.
Figure 13:
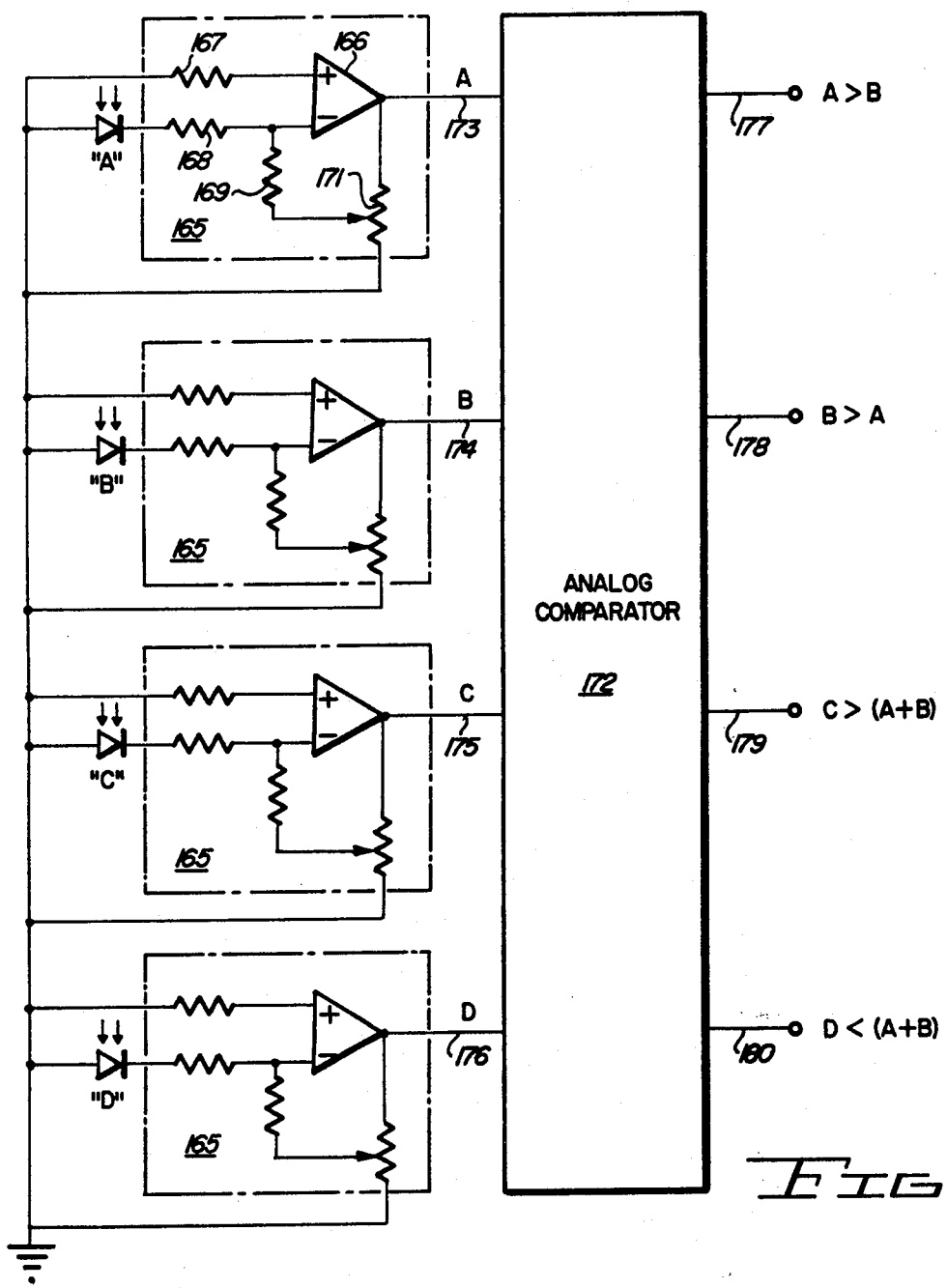
FIG. 13 is a circuit diagram showing the detector and comparator circuits employed with the sensor element of FIG. 12.

The control system 40 of FIG. 5 as just described represents a specific implementation of a control strategy, i.e. the system reacts in certain ways to the occurrence of various conditions including collector and storage temperature, sunrise, sunset, etc. This general control strategy may be implemented in other ways without departing from the general teachings of the invention. Such variations may incorporate, for example, a different sensor element and difference in the sensor directional control circuits. FIGS. 12–13 illustrate one such variation which produces certain advantages over the first embodiment already described.

Shown in FIG. 12 is a modified sensor element 153 comprising a primary sensor array 154 augmented by two lateral sensor elements or photo diodes 155 and 156. The primary array 154 is identical to the sensor element 63 of FIG. 9, comprising two photo diodes 157 and 158, symmetrically shielded by a rectangular plate 159 which partially equally shades the two diodes 157 and 158 when the directional vector 161 is aligned with the direction of the sun. The diodes 157 and 158 are mounted on a base plate 162 which corresponds to plate 65 of FIG. 9. Attached to both sides of plate 162, to the left and to the right, are perpendicular plates 163 and 164, respectively, which shield the sensors 157 and 158 from light sources located at points lying in other than the general direction of vector 161. At the center of each of the plates 163 and 164 on their outboard surfaces, the diodes 157 and 158 are mounted for exposure to light sources positioned laterally with respect to the vector 161. As will be apparent from the drawing, diode 155, which is further identified as sensor "C" in FIG. 12, will be exposed to a light source positioned 90° counterclockwise from vector 161 while diodes 156, 157 and 158, further identified in FIG. 12 as sensors "D", "A" and "B", respectively, will be shielded from a source in that direction. Similarly, a light source located 90° clockwise from vector 161 will strike sensor "D" but will not reach sensors "A", "B" or "C". The more elaborate sensor element of FIG. 12 thus has a wider or greater peripheral vision which may be used to advantage in the initial "capture" of the sun's position.

Figure 14:
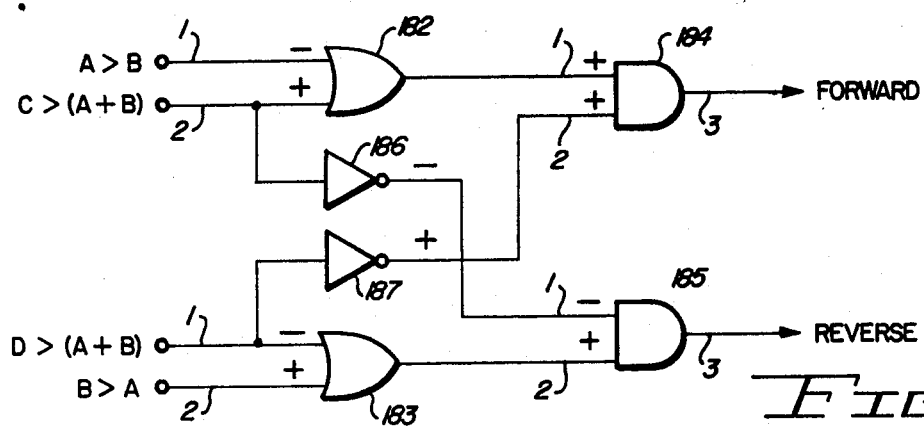
FIG. 14 is a diagram of the directional control circuits employed with the sensor element of FIG. 12 and the circuit of FIG. 13.

The utilization of this added sensor capability calls for modifications in the sensor and directional control circuits. Appropriately modified circuits for this purpose are shown in FIGS. 13 and 14.

FIG. 13 shows the analog circuits which detect signals generated by the photo diodes 155–158, compare their relative strengths, and generate output signals which are utilized to determine the appropriate direction of rotation for achieving alignment with the sun.

Associated with each of the photo diodes 155–158 is a current-to-voltage converter 165, the converter comprising a comparator or differential amplifier 166, input resistors 167 and 168, feedback resistor 169 and balancing potentiometer 171. Input resistor 167 connects the non-inverting input terminal of amplifier 166 to ground. Resistor 168 connects the inverting input terminal of amplifier 166 to the cathode of the photo diode, 155, 156, 157 or 158, the anode of the photo diode being connected to ground. The fixed terminals of the potentiometer 171 are connected between the output terminal of amplifier 166 and ground, and resistor 169 is connected between the brush of potentiometer 171 and the inverting input terminal of amplifier 165.

In the operation of the converter 165, the exposure of one of the diodes, 155–158, to a light source causes a current to flow across the junction of the diode from cathode to anode. The current thus generated flows from the inverting input terminal of amplifier 166 through resistor 168 and through the diode to ground. The effect of this current is a small negative voltage less than 0.6 volts produced at the cathode of the photo diode, this negative voltage representing an input voltage to the amplifier 166. Because the negative voltage is presented at the inverting input terminal, the output voltage of amplifier 166 will be positive and of a magnitude determined by the relative values of resistors 168 and 169 and the setting of potentiometer 171. The four potentiometers are adjusted with the photo diodes 155–158 shielded from light to produce zero or at least balanced output signals A, B, C and D.

The output signals A, B, C and D are fed into an analog comparator network 172. Network 172 has four input terminals 173–176 and four output terminals 177–180. Input signals A, B, C and D are delivered, respectively, to terminals 173, 174, 175 and 176. Network 172 compares signals A and B and produces high or low (positive or zero) signals at output terminals 177–180. A positive signal is produced at terminal 177 if A is greater than B and a positive signal is produced at terminal 178 if B is greater than A. A zero level in either case indicates the condition is not true. In addition, the sum of signals A and B is compared with signals C and D. If C is greater than the sum of A and B, a positive signal is produced at terminal 179; if D is greater than the sum of A and B, a positive signal is produced at terminal 180.

The directional control circuit 181 of FIG. 14 is designed to respond to the four output signals produced by network 172. Circuit 181 comprises two OR gates, 182 and 183, two AND gates, 184 and 185 and two inverters 186 and 187. Each of the OR gates and each of the AND gates has two input terminals, 1 and 2, and an output terminal 3. Input terminal 1 of gate 182 is connected to terminal 177 of network 172. Terminal 2 of gate 182 is connected to terminal 179 of network 172 and through inverter 186 to terminal 1 of gate 185. Terminal 1 of gate 183 is connected to terminal 180 of network 172 and through inverter 187 to terminal 2 of gate 184. Terminal 2 of gate 183 is connected to terminal 178 of network 172. Output terminal 3 of gate 182 is connected to input terminal 1 of gate 184, and output terminal 3 of gate 183 is connected to input terminal 2 of gate 185.

The OR gate 182 or 183 produces a positive signal at its output terminal 3 if a positive signal is present at either or both of its input terminals 1 and 2. The AND gate 184 or 185 produces a positive signal at its output terminal 3 if positive signals are present at both its input terminals 1 and 2.

Circuit 181 is designed to give priority to the signals C>(A + B) and D>(A + B) over the signals A>B and B>A. The purpose of such a priority assignment is to prevent improper adjustment of the collector array position when control is lost by the primary sensor array 154. For this condition, the signals A>B and B>A are not neccessarily representative of the position of the sun and they may actually be produced by reflections from clouds or other objects.

Consider, for example, the condition of a sun position 90° counter-clockwise from vector 161 of FIG. 12. Assume also that reflections from a cloud produce a positive signal at terminal 178 and a negative signal at terminal 177, both indicating the condition B>A. The condition B>A would seem to indicate a solar position clockwise from vector 161 and would call for clockwise or forward rotation of the collector array whereas the true position of the sun calls for counter-clockwise or reverse rotation. At the same time, direct solar radiation to photo diode "C" with only reflected light reaching diodes "A", "B" and "D" results in a positive signal at terminal 179, indicating C>(A + B) and a negative signal at terminal 180.

On the basis of the above-assumed conditions, the signals at the input terminals of gates 182 and 183 are as follows: Input terminals 1 and 2 of gate 182 are negative and positive, respectively, and terminals 1 and 2 of gate 183 are also negative and positive, respectively. These conditions are indicated by the positive and negative signs at the input terminals in FIG. 14. Because at least one input terminal of each gate is positive, the output terminals of both gates 182 and 183 are also positive as indicated. Inverter 186 inverts the positive signal at terminal 2 of gate 182 and delivers a negative signal as indicated to terminal 1 of gate 185. Inverter 187 inverts the negative signal from terminal 1 of gate 183 and delivers a positive signal to terminals 2 of gate 184. Examination of gates 184 and 185 now reveals that both terminals 1 and 2 of gate 184 are positive while only one input terminal of gate 185 is positive. Consistent with the characteristic of the AND gate, the output of gate 184 is thus positive, correctly indicating forward (FWD) rotation while the output of gate 185 is low. It will be noted that a reversal in the signals at terminal 1 of gate 182 and terminal 2 of gate 183 to positive and negative, respectively, will have no effect on the end result because the output of gate 182 will still be positive. The output of gate 183 will be negative, but this result will not alter the output of gate 185. The signal C>(A + B) thus takes precedence as desired.

Because the modified sensor array of FIG. 12 and the characteristics of the circuits of FIGS. 13 and 14 permit capture of the sun's position regardless of the instantaneous position of the collector array, it is not necessary to lead the position of the sun as described in connection with the first embodiment of the invention. The modified sensor and associated circuits are, however, readily adaptable to the same control strategy. Furthermore, response to other system control signals, such as collector and storage temperatures, pump operation, sunset and sunrise, may readily be accomplished through the use of additional AND and OR gates, inverters and other digital control circuits.

A complete and effective control system is thus provided for directional control of a solar collector array in accordance with the stated objects of the invention. Although but a single embodiment of the invention has been illustrated and described along with a single variation, it will be apparent to those skilled in the art that various other changes and modifications may be made therein without departing from the spirit of the invention or from the scope of the appended claims.

What is claimed is:

1. A sun-tracking system for controlling the position of one or more solar collectors comprising:

motor means for moving one or more solar collectors in unison to follow the sun, a control system for said motor means comprising a pair of light sensitive photo diodes for mounting on the solar collector, said diodes being isolated from each other such that when one of said diodes is directionally aligned with the sun the associated collector is directed toward the sun, the other of said diodes being directly aligned with the sun when the associated collector is in a non-aligning position with the sun, first and second directional sensing amplifiers connected to receive output signals from said first and second diodes, respectively, a night shut-down amplifier, a pre-positioning amplifier, a summing amplifier having a plurality of input terminals for receiving positive or negative output signals from said first and second directional sensing amplifier, said night shut-down amplifier and said pre-positioning amplifier and generating an output signal at an output terminal in response thereto, an inverting amplifier circuit and a non-inverting amplifier circuit, the output of said summing amplifier being connected to said inverting amplifier and to said non-inverting amplifier, a pair of motion limit control circuits having input terminals one connected to an output terminal of each of said inverting amplifier circuit and said non-inverting amplifier circuit for energizing either depending on the polarity of the output of said summing amplifier, a directional relay driver connected to an output terminal of said inverting amplifier circuit, a first motor control circuit for causing said motor means connected to said inverting amplifier circuit to rotate in a given direction when said inverting amplifier circuit generates a given output signal, said non-inverting amplifier when generating a given output signal energizing said motor means causing said motor means to rotate in a reverse direction, the output terminals of said pair of motion limit control means being connected to said motor means for controlling said motor means to cause movement of the associated collector in opposing directions, said night shut-down amplifier energizing said pre-positioning amplifier when a signal representing lack of sun rays is sensed, said pre-positioning amplifier actuating said summing amplifier to energize said motor means to rotate the associated collectors in said reverse direction to a given position for receiving the morning sun rays the following day.

2. The sun-tracking system set forth in claim 1 wherein:

said diodes are oppositely polarized.

3. The sun-tracking system set forth in claim 1 wherein:

said diodes further comprise a second pair of diodes, one positioned laterally of each of said diodes for sensing light sources located at points other than direct alignment with the sun.

4. The sun-tracking system set forth in claim 3 in further combination with:

an analog comparator connected to receive signals from said diodes and said pair of diodes for providing resulting signals to said summing amplifier.

5. The sun-tracking system set forth in claim 1 wherein:

said non-inverting amplifier and said inverting amplifier are energized by opposite polarity signals.

6. The sun-tracking system set forth in claim 5 wherein:

said non-inverting amplifier is actuated by a negative input signal in excess of a given value, and
said inverting amplifier is actuated by a positive input signal.

7. The sun-tracking system set forth in claim 1 in further combination with:

a high-temperature defocusing means connectable to the collectors for sensing the heat generated thereby and at a given temperature generating a signal which is transmitted to one of the motion limit control circuits for causing the motor means to move the collector out of alignment with the sun's rays.

8. The sun-tracking system set forth in claim 7 wherein:

said night shut-down amplifier is further connected to said pre-positioning amplifier to actuate said pre-positioning amplifier to cause said motor means to move the collectors out of alignment with the sun's rays.

9. The sun-tracking system set forth in claim 1 in further combination with:

pump signal means connected to said one of said motion limit control circuits causing reverse movement of the collector for energizing it when a predetermined signal is received.

* * * * *

UNITED STATES PATENT OFFICE
CERTIFICATE OF CORRECTION

Patent No. 4,146,785     Dated March 27, 1979

Inventor(s) Stephen D. Neale

It is certified that error appears in the above-identified patent and that said Letters Patent are hereby corrected as shown below:

The address of the Assignee, Sunpower Systems Corporation, in the heading of the patent should read Tempe, "Arizona" rather than Tempe, "Arkansas".

Signed and Sealed this

Twenty-sixth Day of June 1979

[SEAL]

Attest:

RUTH C. MASON
Attesting Officer

DONALD W. BANNER
Commissioner of Patents and Trademarks